US010227223B2

(12) United States Patent
McVicar et al.

(10) Patent No.: US 10,227,223 B2
(45) Date of Patent: Mar. 12, 2019

(54) PEDESTRIAN TRUCK STEERING

(71) Applicant: COMBILIFT, County Monaghan (IE)

(72) Inventors: Martin McVicar, County Monaghan (IE); Robert Moffett, County Monaghan (IE); Mark Whyte, County Monaghan (IE)

( * ) Notice: Subject to any disclaimer, the term of this patent is extended or adjusted under 35 U.S.C. 154(b) by 0 days.

(21) Appl. No.: 15/523,005

(22) PCT Filed: Oct. 27, 2015

(86) PCT No.: PCT/EP2015/074906
§ 371 (c)(1),
(2) Date: Apr. 28, 2017

(87) PCT Pub. No.: WO2016/066658
PCT Pub. Date: May 6, 2016

(65) Prior Publication Data
US 2017/0334695 A1 Nov. 23, 2017

(30) Foreign Application Priority Data
Oct. 30, 2014 (GB) .................................. 1419339.5

(51) Int. Cl.
*B66F 9/075* (2006.01)
*B62D 1/14* (2006.01)
(Continued)

(52) U.S. Cl.
CPC ............ *B66F 9/07568* (2013.01); *B62D 1/14* (2013.01); *B62D 7/1509* (2013.01); *B62D 7/159* (2013.01); *B66F 9/07* (2013.01)

(58) Field of Classification Search
CPC ...... B66F 9/07568; B66F 9/07; B62D 7/1509; B62D 1/14; B62D 7/159
See application file for complete search history.

(56) References Cited

U.S. PATENT DOCUMENTS 5,657,828 A * 8/1997 Nagamachi ......... B60L 11/1805
180/168
5,810,104 A * 9/1998 Campbell .............. B62D 51/04
180/19.2
(Continued)

FOREIGN PATENT DOCUMENTS

BE 903607 3/1986
DE 20007291 9/2001
(Continued)

OTHER PUBLICATIONS

Search Report issued by the United Kingdom Intellectual Property Office for corresponding application No. GB1419339.5 dated Apr. 23, 2015.
(Continued)

*Primary Examiner* — Darlene P Condra
(74) *Attorney, Agent, or Firm* — Whiteford, Taylor & Preston, LLP; Gregory M. Stone

(57) ABSTRACT

A pedestrian truck (50) steered with a tiller (56) is operable in a first mode where a controllable front wheel (64) is aligned generally parallel with a front-rear center line of the truck, or a second mode where the wheel is generally perpendicular to the front-rear center line. A steering controller can operate in either a normal steering mode to steer the rear steerable wheel (52) in the same sense (clockwise or anticlockwise) as the tiller is rotated and in an alternate steering mode to steer the rear steerable wheel in the opposite sense to the rotation of the tiller. A steering mode selector is provided which automatically engages the alternate steering mode when the truck is in the second mode of operation and either (i) the tiller is positioned on the same side of the center line as the controllable front wheel and the drive direction is such that the tiller leads the truck (FIGS. 12-14), or (ii) the tiller is positioned on the same side of the
(Continued)

center line as the castor front wheel (58) and the drive direction is such that the tiller trails the truck (FIGS. 4, 5).

12 Claims, 8 Drawing Sheets

(51) Int. Cl.
*B62D 7/15* (2006.01)
*B66F 9/07* (2006.01)

(56) References Cited

U.S. PATENT DOCUMENTS

| | | | |
|---|---|---|---|
| 6,260,646 B1 * | 7/2001 | Fernandez | B62B 3/0612 |
| | | | 180/12 |
| 2010/0230201 A1 | 9/2010 | McVicar | |
| 2016/0297474 A1 * | 10/2016 | Shi | B60K 7/0007 |

FOREIGN PATENT DOCUMENTS

| | | |
|---|---|---|
| GB | 2510896 | 8/2014 |
| WO | 02/072407 | 9/2002 |
| WO | 2014/037033 | 3/2014 |

OTHER PUBLICATIONS

International Search Report issued in PCT/EP2015/074906 dated Feb. 9, 2016.

* cited by examiner

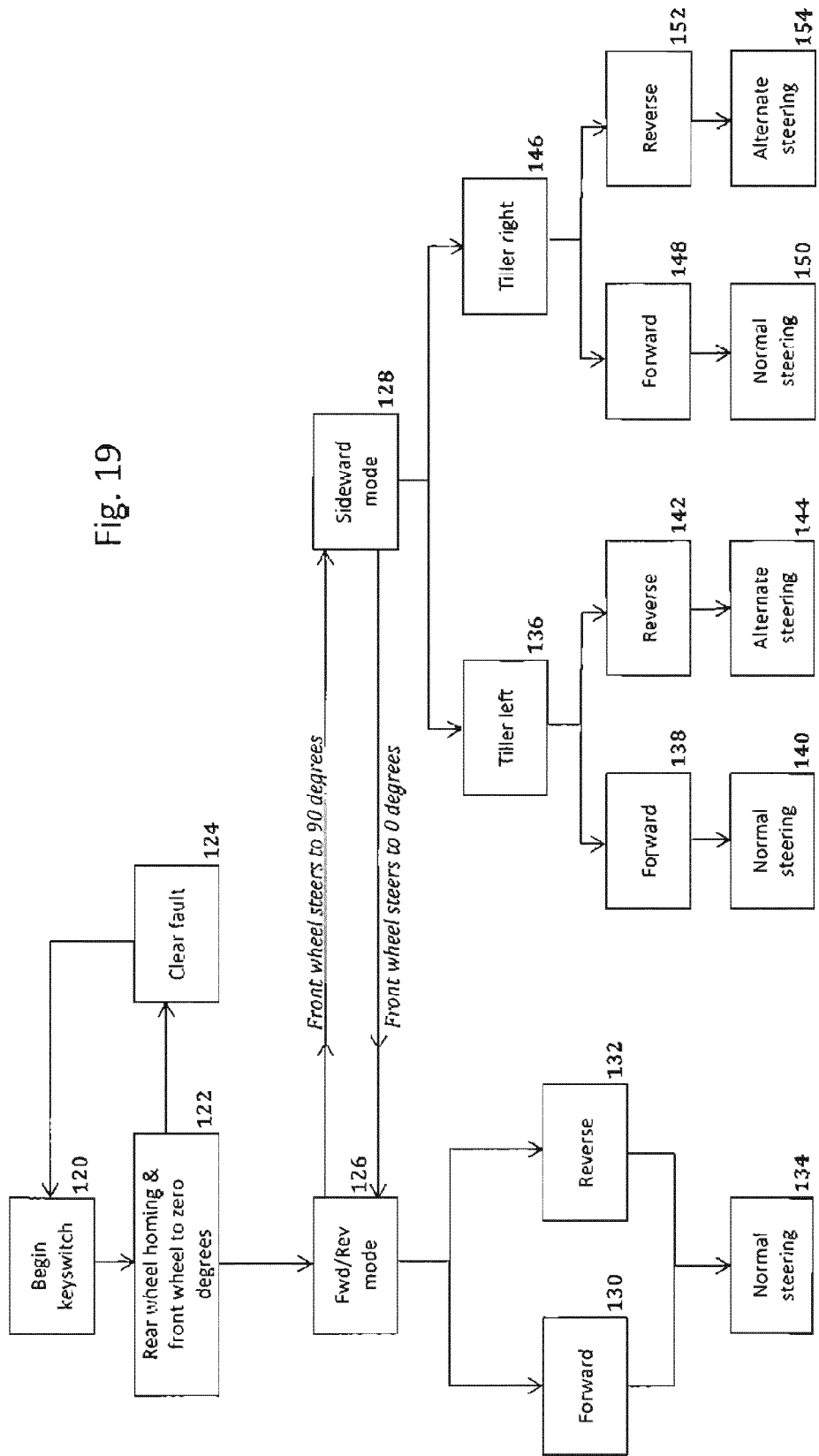

PEDESTRIAN TRUCK STEERING

TECHNICAL FIELD

This invention relates to pedestrian trucks such as pallet trucks, and in particular to pedestrian trucks provided with tiller steering.

BACKGROUND ART

Pedestrian trucks are well known in the art and the most common type is a pedestrian pallet truck. Such trucks have a pair of front forks for engaging with and lifting a pallet clear of the ground. The operator steers the truck using a rear tiller to control one or more rear steered wheels. The tiller handle will optionally have operator controls for engaging and controlling a drive motor (if the truck is a powered, driven truck), the operation of the forks, and so on.

FIG. 1 shows a conventional pedestrian controlled powered truck 10 for handling palletised and compact loads. The truck is fitted with a steered driven wheel 12 at the rear end 14. The steering is controlled via a tiller arm 16. The truck is fitted with a non-driven castor wheel 18 at the front end 20 on the right-hand side 22. The truck is also fitted with a non-driven wheel 24 on the front left-hand side 26. This non-driven front wheel 24 is coupled to a hydraulic cylinder 28 which keeps the wheel 24 parallel to the forks 30 (i.e. at an angle which will be referred to herein as zero degrees).

The truck 10 is fitted with electric power steering (not shown). The tiller's rotation, clockwise or anti-clockwise about the tiller's vertical pivot axis, which is approximately vertically above the rear steered driven wheel 12, is translated directly to the steering angle of that rear wheel 12. (The tiller may also pivot about a horizontal axis, allowing it to tilt between a near-vertical and a horizontal position, but such movements do not affect steering except insofar as the tiller also pivots around its vertical steering axis.) The truck of FIG. 1 is configured to operate in a first mode of operation, i.e. the forward and reverse drive directions are aligned toward the front 20 and rear 14 ends, as indicated by the arrows 32. (As used herein, forward means towards the ends of the forks, when the truck is in the first mode of operation; when in the second, sidewards mode described below, forward is in the direction away from the operator's end of the tiller with the tiller trailing the truck).

FIG. 2 shows same truck when operating in a second mode of operation. The hydraulic cylinder 28 has now rotated the front left-hand wheel 24 perpendicular to the forks (i.e. 90 degrees). The front left-hand wheel 24 has only 2 positions, 0 degrees and 90 degrees. The operator can select either of these 2 positions with a switch on the tiller handle 34. The operator has also turned the rear wheel 12 by 90 degrees via the tiller 16 which is now disposed generally perpendicular to the forks 30. The right-hand castor wheel will freely follow the direction of travel.

When in this mode of operation the truck can be used to handle long loads more easily. The "forward" and "reverse" directions of travel are now perpendicular to the forks also as indicated by the arrows 32.

Tiller steering can be somewhat unintuitive, and is particularly so when the tiller is being used to steer a wheel which (as in the configuration of FIG. 2) is mounted on one side of the truck, rather than being a central rear steered wheel as in the FIG. 1 configuration. While an operator may learn by trial and error how to manoeuvre the truck of FIG. 2, such on-the-job learning is potentially dangerous when handling a long load which projects out from the forks on either side by perhaps a few meters, in what will typically be an industrial or workplace environment with other workers and other machinery in operation.

Steering arrangements from vehicles where the operator is seated in a fixed position tend not to be of assistance due to the very different outlook of a pedestrian operator who is walking behind a truck and is in the mindset of "pushing" the truck and steering with large physical tiller movements when driving the truck forwards ahead of himself or herself.

DISCLOSURE OF THE INVENTION

There is provided a pedestrian truck comprising:
a rear steerable wheel disposed at a rear end of the truck generally along a front-rear centre line of the truck;
a tiller providing an operator input to steer said rear wheel by rotation of the tiller about a tiller axis;
a steering controller for steering said rear wheel in response to said tiller rotation;
a controllable front wheel disposed at a front end of the truck and offset to one side of the centre line;
a castor front wheel disposed at said front end of the truck and offset to the other side of the centre line;
an alignment mechanism for aligning the controllable front wheel either generally parallel with a front-rear centre line of the truck when the truck operates in a first mode of operation, or generally perpendicular to said front-rear centre line of the truck when the truck operates in a second mode of operation; and
a drive mechanism for driving at least one wheel of the truck in a forwards or reverse direction in response to an operator control;
wherein said steering controller is operable in a normal steering mode to steer the rear steerable wheel in the same sense (clockwise or anticlockwise) as the tiller is rotated and in an alternate steering mode to steer the rear steerable wheel in the opposite sense to the rotation of the tiller;
the truck further comprising a steering mode selector for automatically engaging the alternate steering mode of the steering controller when the truck is in the second mode of operation and either (i) the tiller is positioned on the same side of the centre line as the controllable front wheel and the drive direction is such that the tiller leads the truck, or (ii) the tiller is positioned on the same side of the centre line as the castor front wheel and the drive direction is such that the tiller trails the truck.

Unlike tiller steering arrangements known in the art, the present invention inverts the normal steering relationship between the tiller and the steered wheel in specific circumstances when the truck is in the second mode (so that the controllable front wheel is perpendicular to the front-rear centre line of the truck). In particular, the steering relationship is inverted when the tiller leads the truck and is on the same side of the centre line as the controllable front wheel, or when the tiller trails the truck and is on the same side of the centre line as the castor front wheel.

It has been found that this provides a more intuitive and natural steering feel to the operator walking behind the tiller. When the truck is in the more usual first mode of operation, then the steering is preferably not inverted regardless of the direction of travel of the truck i.e. regardless of whether the tiller is leading or trailing the truck.

Preferably, the truck further includes a truck body on which said rear steerable wheel is disposed, and on which said tiller is mounted such that the tiller rotates about an axis generally aligned with the steering axis of the rear steerable wheel.

The rear steerable wheel and the tiller are preferably disposed along the centreline of the truck on the body.

Preferably, said truck body has a pair of forwardly extending feet, each disposed on a respective side of the centre line, and each carrying a respective one of said front wheels.

The truck will further preferably have one or more forwardly extending forks which are operable to be raised and lowered and which are disposed between said forwardly extending feet.

Preferably, said feet are generally parallel and are spaced apart by one another to define an area encompassed on either side by said feet and at the rear by said body, the area being open at a front end allowing the truck to engage a load by driving up to the load such that the load is received within said area.

Preferably, said feet are spaced apart by a gap of at least 800 mm, more preferably at least 1000 mm, most preferably at least 1100 mm.

Such gaps are sized to accommodate the more usual pallets used in industry, and they define typical load sizes.

Preferably, said front wheels are disposed at or towards the front end of said feet, distal from the truck body.

Preferably, said front wheels are disposed towards the front end of said feet within a distance of 300 mm, more preferably within 150 mm from the ends of said feet, measured from the axis of a wheel to the end of the arm.

Preferably, the distance between said rear wheel's rotational axis and a notional line connecting the rotational axes of said front wheels is at least 800 mm, more preferably at least 1000 mm.

Preferably, said steering mode selector is configured to disengage said alternate steering mode and to re-engage the normal steering mode when it is detected that the tiller has passed through the centre line from one side to another.

The truck preferably further comprises a tiller angle detector providing an input to said steering controller and/or said steering mode selector.

Preferably, said steering controller and/or said steering mode selector are programmed functions of a processor which receives as inputs a tiller steering angle and optionally a current steered rear wheel angle, and which provides as an output steering motor control signal.

BRIEF DESCRIPTION OF DRAWINGS

The invention will be further illustrated with reference to the following description of embodiments thereof, given by way of example only with reference to the accompanying drawings, in which:

FIG. 19 is a flowchart of operation of the steering system of the truck of FIG. 3.

DETAILED DESCRIPTION OF PREFERRED EMBODIMENTS

Figure 2:
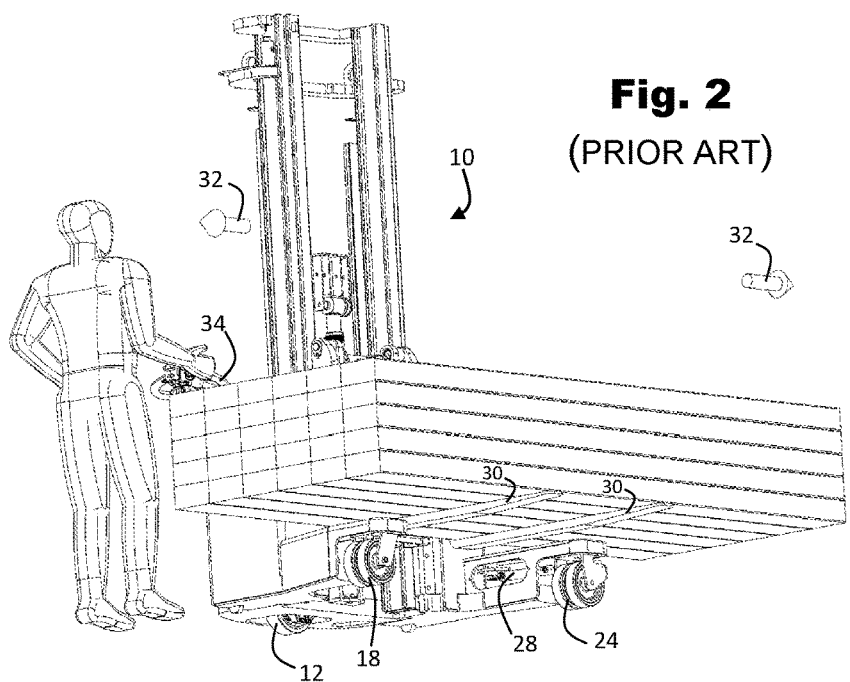
FIG. 2 is a view of the truck of FIG. 1 when in a sidewards driving mode.
Figure 3:
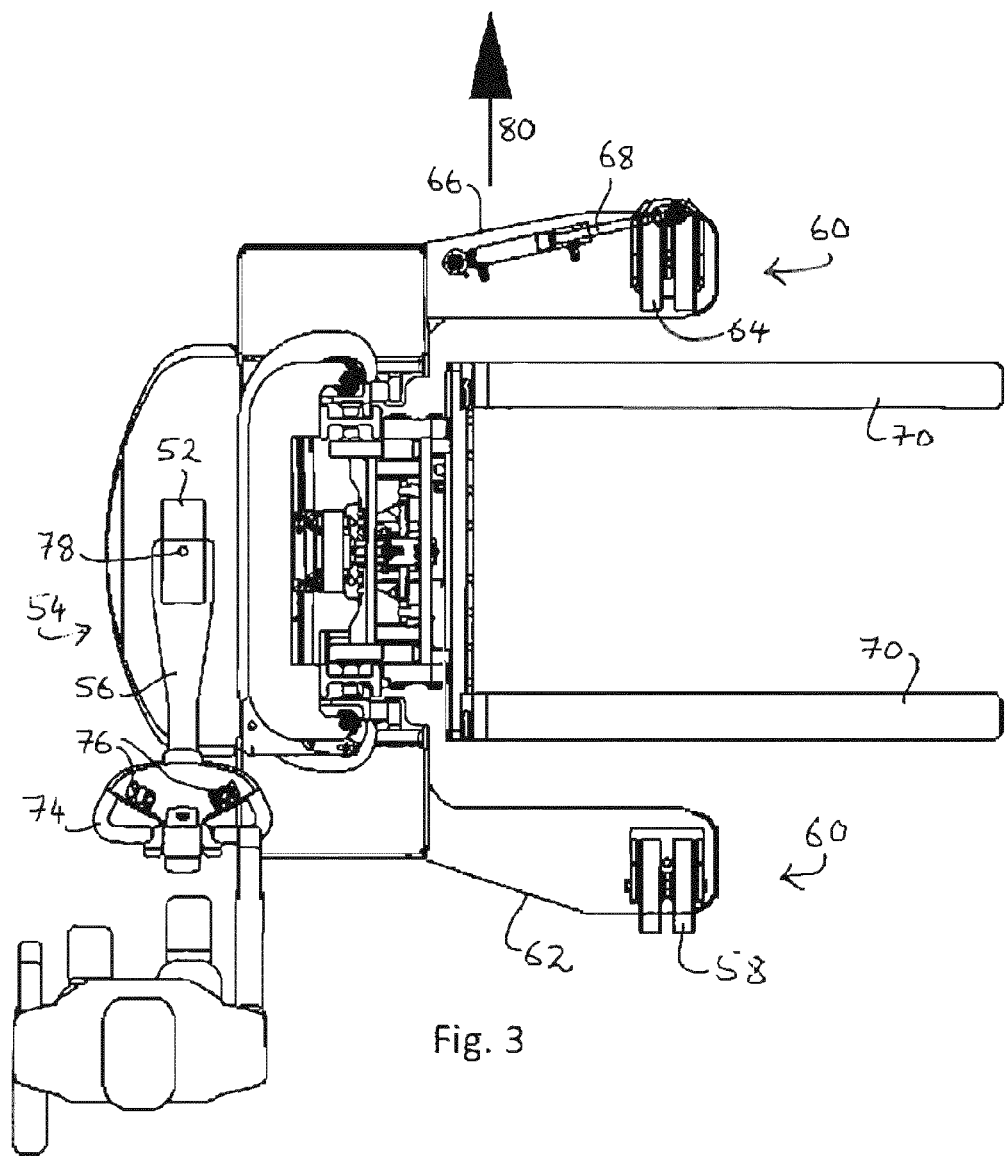
FIG. 3 is a plan view of a truck according to the invention.

FIG. 3 shows a truck 50 according to the invention, in plan view from above. Like the truck of FIGS. 1 and 2, this truck 50 can operate both in a normal first mode of operation and (as shown in FIG. 3) in a second mode of operation.

Figure 1:
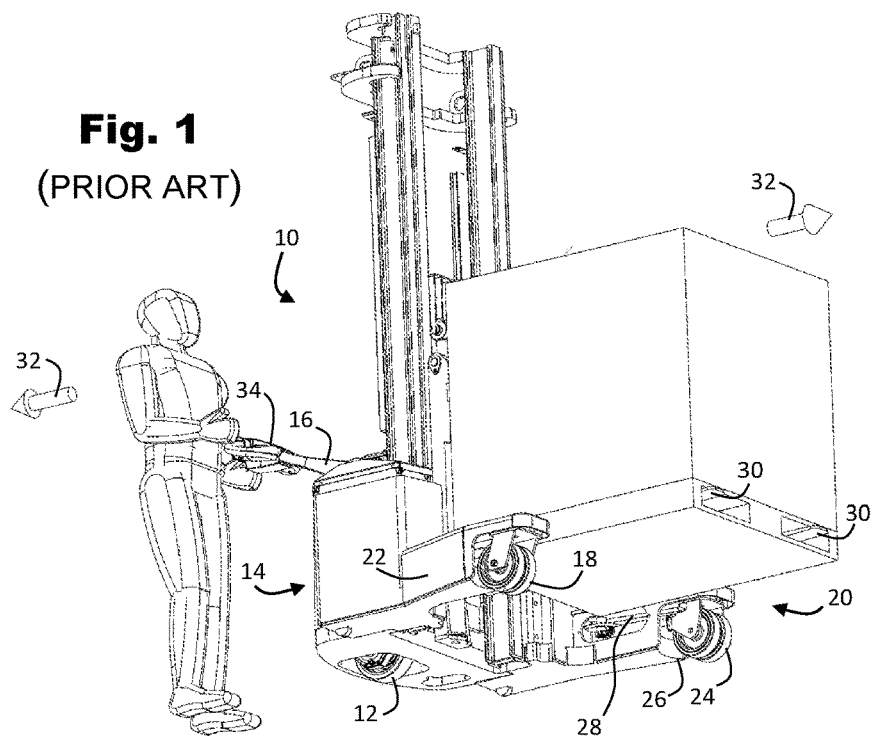
FIG. 1 is a perspective view from below of a conventional pedestrian-controlled powered forklift truck.

As with the truck of FIGS. 1 and 2, the truck of FIG. 3 has steered driven wheel 52 at the rear end 54. The steering is controlled via a tiller arm 56. The truck is fitted with a non-driven castor wheel 58 at the front end 60 on the right-hand side 62. The truck is also fitted with a non-driven wheel 64 on the front left-hand side 66. The front wheels 58, 64 are mounted with their axles 116 mm from the front end 60 of each arm. The wheel base (distance from rear wheel axle to the line joining the front wheel axles) is 1120 mm.

The non-driven front wheel 64 is coupled to a hydraulic cylinder 68 which can align the wheel 64 parallel to the forks 70 when in the first mode of operation, or perpendicular to the forks 70, as shown in FIG. 3, when in the second mode of operation. Selection of the 0 degree or 90 degree angles is made by operator controls 76 on the tiller handle 74.

In the first mode of operation, the truck 50 operates under normal power steering so that the tiller's rotation, clockwise or anti-clockwise about the tiller's vertical pivot axis 78, is translated directly to the steering angle of the rear wheel 52. For maximum intuitiveness the wheel 52 is on the same vertical axis 78.

The right-hand castor wheel 58, as in FIGS. 1 and 2, will freely follow the direction of travel.

The operator controls also determine the drive direction of the driven rear wheel 52. With the tiller projecting to the right of the forks as in FIG. 2 or 3, and the operator behind the tiller, selecting "forward" drive will drive the truck sideward in the direction of the left-hand fork, and away from the operator, as indicated by the arrow 80, so that the operator will walk forwards to stay with the truck. "Reverse" drive is the drive direction that brings the truck towards the operator, in the opposite direction to the arrow 80.

The tiller angle does not directly control the steering angle of the rear wheel 52 of the truck 50, as with conventional powered steering (or mechanical steering). Rather, a steering controller (not shown) is provided which is operable in either a normal steering mode to steer the rear steerable wheel in the same sense (clockwise or anticlockwise) as the tiller is rotated, or in an alternate steering mode to steer the rear steerable wheel in the opposite sense to the rotation of the tiller.

A steering mode selector (not shown) automatically engages the alternate steering mode of the steering controller when the truck is operating in the second mode, and depending on the side of the truck that the tiller is on and the drive direction (forward or reverse).

For the truck of FIG. 3, the alternate steering mode is selected when the truck is in the second mode, the tiller is trailing the truck (the drive mechanism is driving the driven wheel forwards in the direction of arrow 80) and the tiller is on the opposite side of the truck to the controllable front wheel 64.

Figure 4:
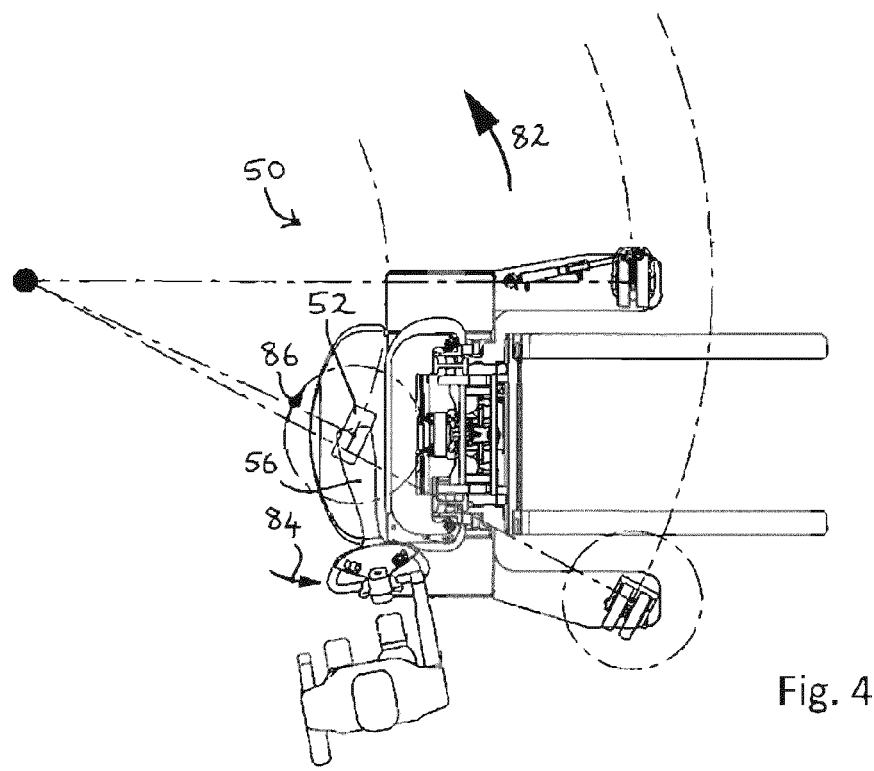
FIGS. 4-18 show the truck of FIG. 3 undergoing a variety of steering and driving operations.

FIG. 4 shows the truck of FIG. 3, when in that mode of operation, driving "forward" (from the operator's viewpoint) and being steered towards the operator's left, i.e. the truck following an anti-clockwise curved path indicated by arrow 82. The steering mode selector, sensing that the second mode and the forward drive direction have both been selected, causes the steering controller to operate in the alternate steering mode, so that the rear wheel 52 is following a steering angle whose sign is opposite to the steering angle of the tiller. When the tiller 56 is steered e.g. 20 degrees anti-clockwise, as shown by arrow 84 in FIG. 4, the steered wheel 52 is rotated about its steering axis 20 degrees clockwise as shown by arrow 86. Note that the steered angle of the wheel and the steering angle of the tiller need not be identical in magnitude. The tiller steering angle can be magnified or decreased as it is translated to the steered angle of wheel 52. What is important is that in the alternate mode of operation the sign of steering direction is reversed between the tiller and the steered wheel.

Figure 5:
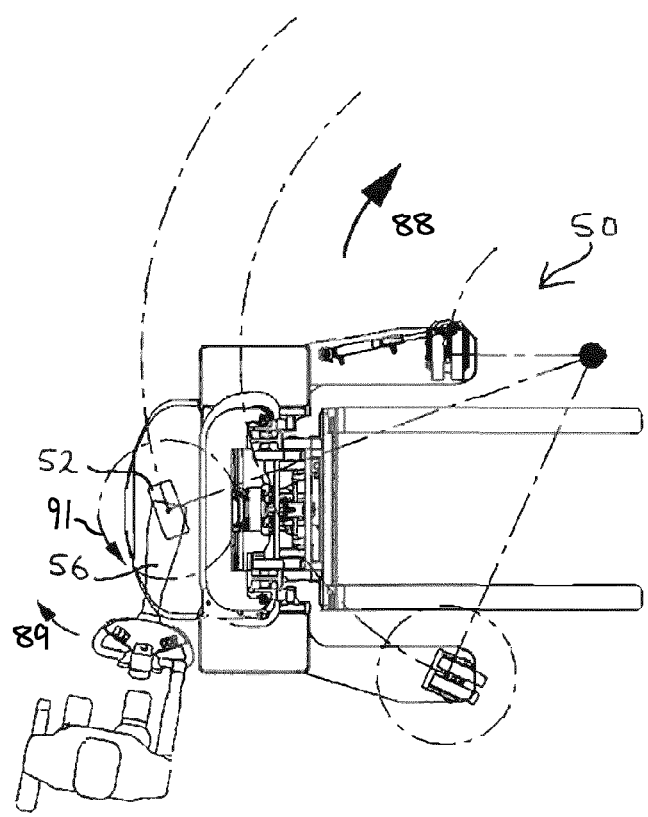

FIG. 5 shows the same truck 50, in the same mode of operation (sideward or second mode) and the same steering mode (alternate), but with the operator steering the truck to follow a clockwise curve 88. The tiller 56 is rotated clockwise 89, and the steered wheel 52 rotates anti-clockwise 91 to cause the truck to follow a clockwise curve.

Figure 6:
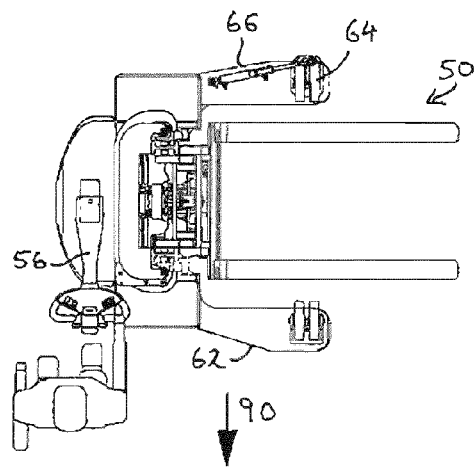

FIG. 6 shows the same truck 50, again in the second mode, when the operator selects reverse drive direction, with the tiller 56 in the straight-ahead or neutral steering position. Selection of the reverse drive direction 90, with the truck in the second mode, causes the steering mode selector to control the steering controller to operate in the normal steering mode, as the tiller 56 is now leading the truck 50 while being on the opposite side 62 from the side 66 of the controllable front wheel 64.

Figure 7:
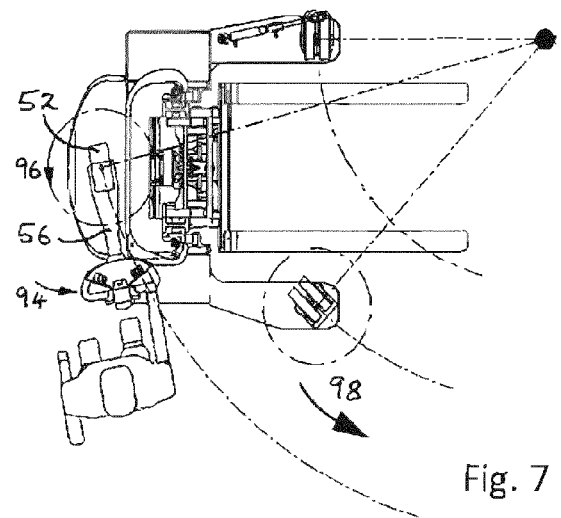

Thus, as seen in FIG. 7, when the operator moves the tiller 56 anti-clockwise 94 the steered wheel 52 follows the tiller and is also rotated anticlockwise 96 and the truck steers in reverse to follow an anticlockwise curve 98.

Figure 8:
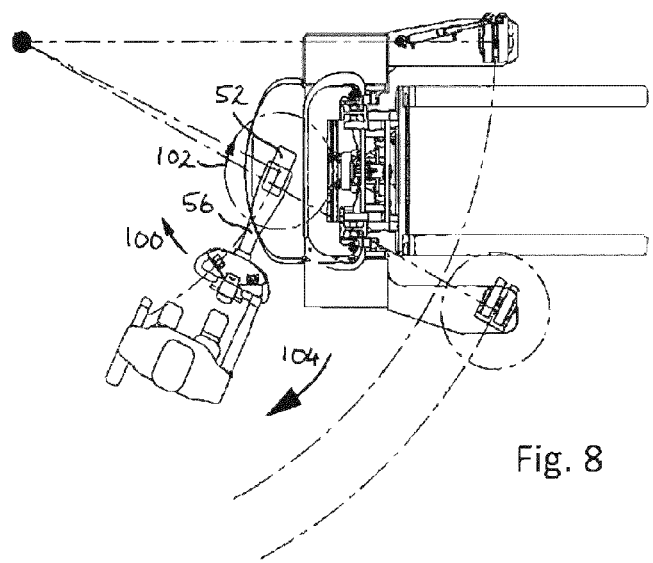

FIG. 8 shows the same truck with the tiller 56 rotated clockwise 100, and the steered wheel 52 also rotated clockwise 102 so that the truck operates in reverse second mode to follow a clockwise curve 104.

Figure 9:
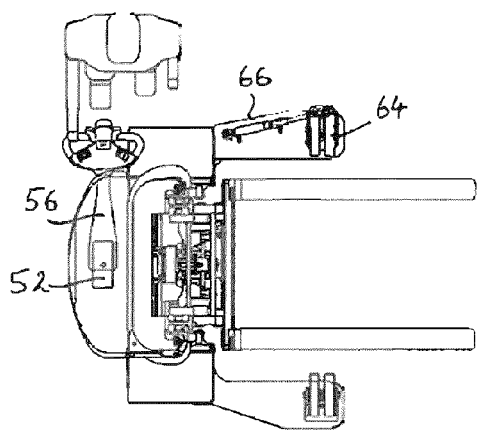
Figure 10:
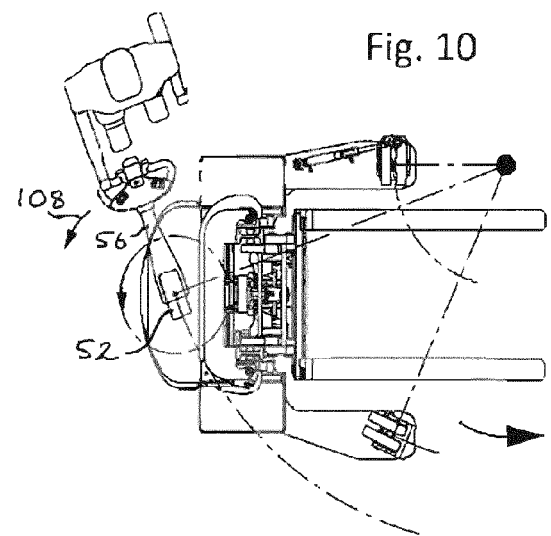
Figure 11:
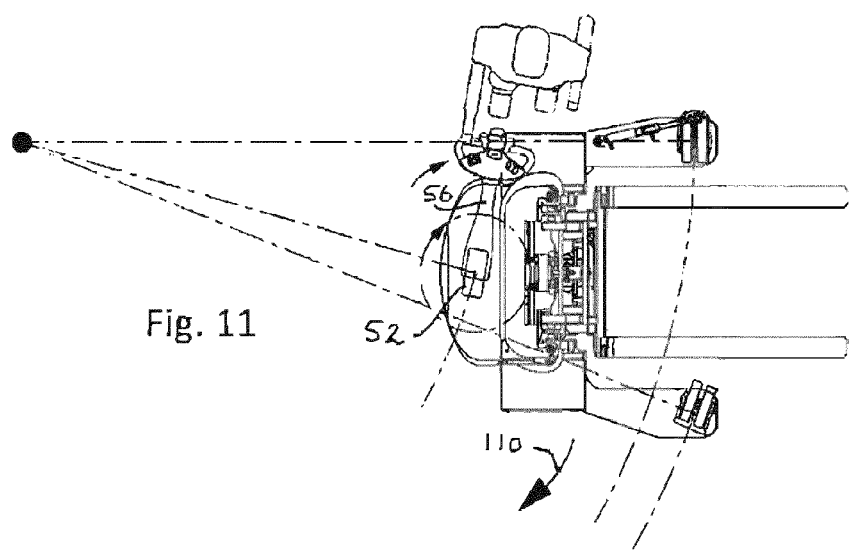
Figure 12:
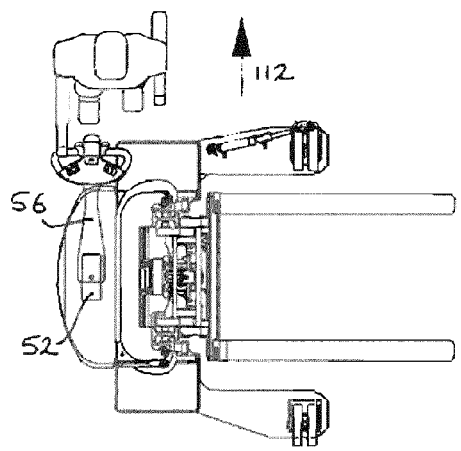
Figure 13:
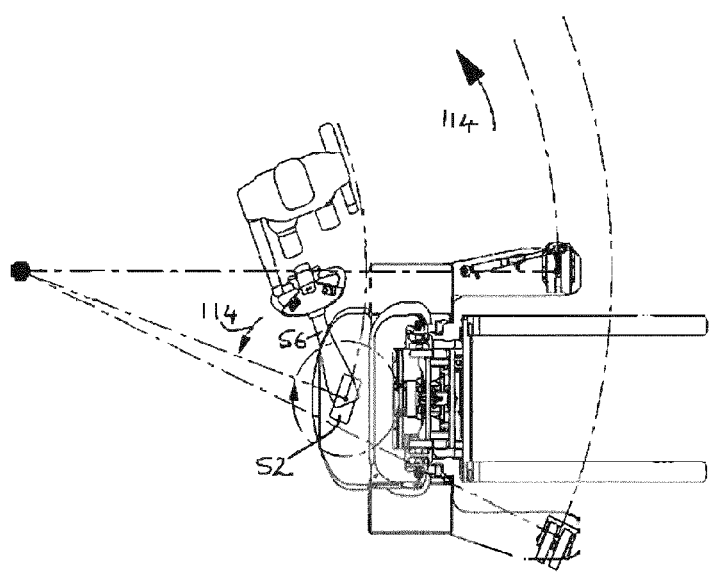
Figure 14:
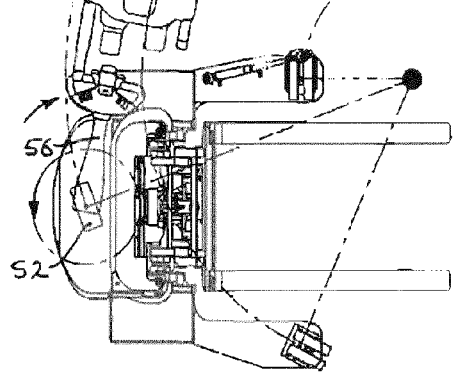

FIGS. 9-14 show the same truck, with the tiller 56 on the same side as the controllable front wheel, i.e. having been swung from the neutral position around to the operator's left-hand side, clockwise. In FIGS. 9-11, the truck is driving forward 106, with the tiller 56 trailing the truck, and thus is in normal steering mode. Thus when the operator moves the tiller anticlockwise 108 (FIG. 10) or clockwise 110 (FIG. 11) the rear wheel 52 follows the same steering angle. In FIGS. 12-14, the truck is being driven in reverse 112, with the tiller 56 leading the truck (FIG. 12), and thus the truck is in the alternate steering mode. Therefore, when the operator steers the tiller 56 anticlockwise 114 (FIG. 13) the steered wheel 52 is rotated clockwise, and vice versa (FIG. 14).

FIGS. 15-18 show the transition of the operator and the tiller from one side of the truck to another.

Figure 15:
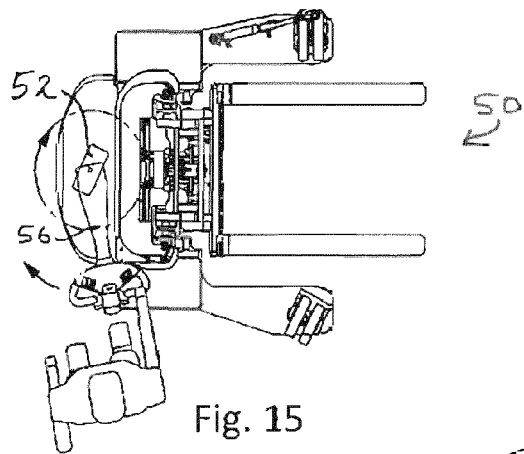
Figure 16:
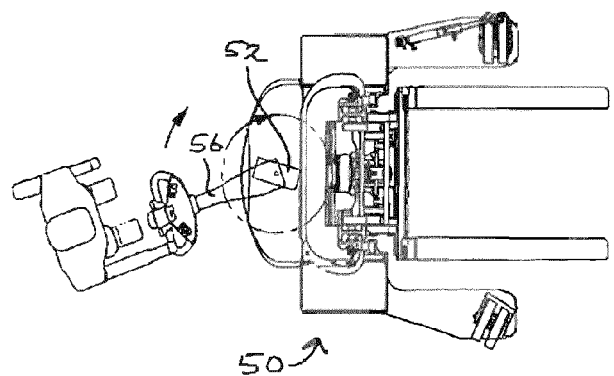
Figure 17:
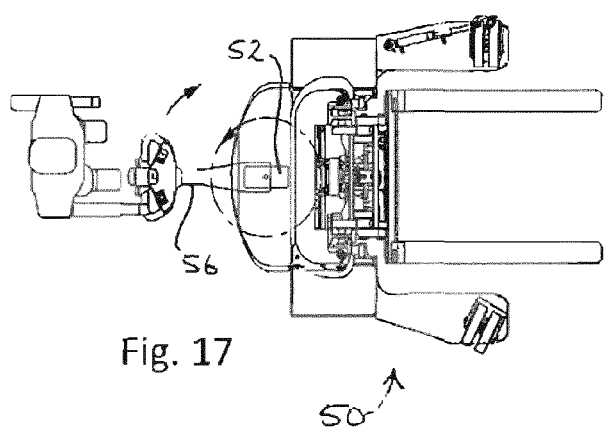

In FIG. 15 the truck is steering in alternate mode, as in FIG. 4. If the operator moves the tiller 56 around to the other side, typically while the truck is stopped, then as the tiller approaches, FIG. 16, the centreline, the wheel 52 is almost 180 degrees out of alignment. This means that when the tiller 56 reaches the centreline (FIG. 17) the steering controller will have placed the wheel 52 180 degrees out of alignment and thus once again it will be aligned with the line of the tiller, albeit with the "forward" drive direction being opposite to the expected direction. The steering controller disengages the alternate steering mode at this point, and recalibrates the drive direction of the wheel so that the wheel is considered aligned fully with the tiller.

Figure 18:
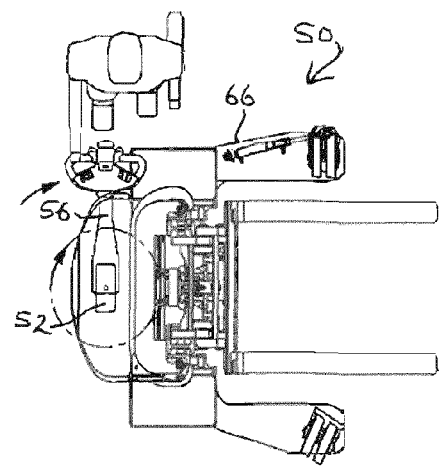

Assuming the operator does not change the selector from the second mode, and continues to swing the tiller clockwise, the wheel will follow the tiller as it moves around to the left 66 of the truck body (FIG. 18). When a drive direction is selected, the steering mode selector will react accordingly, by maintaining normal mode if forward drive is selected, or engaging alternate mode if reverse is selected.

While the above example assumes the operator brings the tiller to exactly 90 degrees before selecting a drive direction, this may or may not happen in reality. The system can be set up with a lockout for the operation of changing sides, whereby the drive would be disabled during this procedure and until the tiller reaches the +90 degrees position of FIG. 18 (angles being measured in a positive clockwise sense from the centreline along which the tiller lies in FIG. 17). Such a lockout ensures that the steered wheel and tiller both start from a neutral position as in FIG. 18 (the operator can be given an indication that the lockout is engaged by e.g. a red light and that the correct position has been reached by e.g. a green light or by a graphical display). Alternatively, the steering controller can be set up to initialise the steered wheel 52 angle as soon as drive is engaged, so that if reverse drive is selected when the tiller is e.g. halfway between the positions of FIG. 17 and FIG. 18, the steering controller will sense the tiller angle to be e.g. +45 degrees (from centreline), deduce that in the alternate steering mode the steered wheel ought to be at an angle of e.g. +135 degrees, and steer the wheel accordingly.

FIG. 19 is a flowchart of operation of the steering system of the truck of FIGS. 3-18. In step 120 the operator engages the keyswitch to start the truck. The steering controller initialises, 122, with a rear wheel homing sequence whereby the angle of the rear wheel is sensed relative to the chassis, and the angle of the tiller is sensed relative to the chassis, and a steering motor aligns the two. A check is also made that the controllable front wheel is aligned with the front-rear centreline of the truck, i.e. the truck is in the first mode of operation. In the event of a fault, 124, this is cleared and the startup sequence begins again at step 120.

The operator has a selector switch to select the first mode 126 or second mode 128. The initialisation sequence places the truck in the former mode, and this will be described first.

A throttle lever is used by the operator to control the direction and rate of travel. The lever can be pushed forward of a neutral position to varying degrees or backward to varying degrees so as to control the velocity of the truck by sending a throttle signal to the drive motor associated with the rear wheel, driving the truck forward 130 or in reverse 132.

As indicated at 134, regardless of which drive direction 130,132 has been selected, the truck operates in normal steering mode. This means that a steering mode selector, which receives as inputs the throttle drive selection (forward or reverse), the tiller angle, and the selector switch selection (in this case the later being set to the first mode), determines that the combination of inputs should result in a normal steering mode. It can be seen that in this embodiment, normal steering mode is always selected when the truck is in the first mode.

The steering mode selector output is received by a steering controller which receives as inputs the tiller angle sensor signal and rear wheel steering angle sensor signal, and which provides as an output a steering motor control signal. In normal steering mode, the steering controller operates a feedback mechanism to ensure that the angle of the steered wheel is matched to the input from the tiller and thus when the tiller moves clockwise or anticlockwise, the steered wheel motor is activated to steer the rear wheel in the same sense (clockwise or anticlockwise) until the input from the rear wheel steering angle sensor matches that from the tiller angle sensor. In this way the tiller and steered wheel are kept aligned, within the limits of the feedback mechanism and motor speed.

If the operator selects to operate in the second mode, the flowchart process moves to step 128. The steered front wheel is rotated about its vertical axis by 90 degrees so that it is oriented perpendicular to the front-rear centreline of the truck. The steering mode controller then awaits a tiller angle input signal indicating a decisive move of the tiller to the left or right side of the truck. (By left, we mean that the tiller swings clockwise; by right, we mean anticlockwise.)

When the tiller is moved left, 136, it will be on the same side as the controllable front wheel (see FIG. 9), and thus if a forward drive direction is selected, 138, the steering mode selector enforces normal steering mode 140, and the truck will operate as in FIGS. 10 and 11. If reverse drive is selected, 142, then the steering mode controller will engage alternate steering mode, 144 and the truck will operate as per FIGS. 12-14.

Conversely if the tiller is moved to the right side of the centreline while in the second mode, 146, then in a forward drive direction, 148, the truck will operate in alternate mode 150 as in FIGS. 3-5. If a reverse drive is selected, 152, then the truck will operate in normal mode, 154, as in FIGS. 6-8.

Whenever the operator switches back to the first mode, the steered wheel will align to the tiller, and the steering mode selector will re-engage normal mode.

The invention claimed is:

1. A pedestrian truck comprising:
   a rear steerable wheel disposed at a rear end of the truck generally along a front-rear center line of the truck;
   a tiller providing an operator input to steer said rear wheel by rotation of the tiller about a tiller axis;
   a steering controller for steering said rear wheel in response to said tiller rotation;
   a controllable front wheel disposed at a front end of the truck and offset to one side of the center line;
   a castor front wheel disposed at said front end of the truck and offset to the other side of the center line;
   an alignment mechanism for aligning the controllable front wheel either generally parallel with a front-rear center line of the truck when the truck operates in a first mode of operation, or generally perpendicular to said front-rear center line of the truck when the truck operates in a second mode of operation; and
   a drive mechanism for driving at least one wheel of the truck in a forwards or reverse direction in response to an operator control;
   wherein said steering controller is operable in a normal steering mode to steer the rear steerable wheel in the same sense (clockwise or anticlockwise) as the tiller is rotated and in an alternate steering mode to steer the rear steerable wheel in the opposite sense to the rotation of the tiller;
   the truck further comprising a steering mode selector for automatically engaging the alternate steering mode of the steering controller when the truck is in the second mode of operation and either (i) the tiller is positioned on the same side of the center line as the controllable front wheel and the drive direction is such that the tiller leads the truck, or (ii) the tiller is positioned on the same side of the center line as the castor front wheel and the drive direction is such that the tiller trails the truck.

2. A pedestrian truck according to claim 1, further comprising a truck body on which said rear steerable wheel is disposed, and on which said tiller is mounted such that the tiller rotates about an axis generally aligned with the steering axis of the rear steerable wheel.

3. A pedestrian truck according to claim 2, wherein said truck body has a pair of forwardly extending feet, each disposed on a respective side of the center line, and each carrying a respective one of said front wheels.

4. A pedestrian truck according to claim 3, further comprising one or more forwardly extending forks which are operable to be raised and lowered and which are disposed between said forwardly extending feet.

5. A pedestrian truck according to claim 3, wherein said feet are generally parallel and are spaced apart by one another to define an area encompassed on either side by said feet and at the rear by said body, the area being open at a front end allowing the truck to engage a load by driving up to the load such that the load is received within said area.

6. A pedestrian truck according to claim 5, wherein said feet are spaced apart by a gap of at least 800 mm, more preferably at least 1000 mm, most preferably at least 1100 mm.

7. A pedestrian truck according to claim 3, wherein said front wheels are disposed at or towards the front end of said feet, distal from the truck body.

8. A pedestrian truck according to claim 7, wherein said front wheels are disposed towards the front end of said feet within a distance of 300 mm, more preferably within 150 mm from the ends of said feet, measured from the axis of a wheel to the end of the arm.

9. A pedestrian truck according to claim 1 wherein the distance between said rear wheel's rotational axis and a notional line connecting the rotational axes of said front wheels is at least 800 mm, more preferably 1000 mm.

10. A pedestrian truck according to claim 1, wherein said steering mode selector is configured to disengage said alternate steering mode and to re-engage the normal steering mode when it is detected that the tiller has passed through the center line from one side to another.

11. A pedestrian truck according to claim 1, further comprising a tiller angle detector providing an input to said steering controller and/or said steering mode selector.

12. A pedestrian truck according to claim 1, wherein said steering controller and/or said steering mode selector are programmed functions of a processor which receives as inputs a tiller steering angle and optionally a current steered rear wheel angle, and which provides as an output steering motor control signal.

* * * * *